Figure 1:
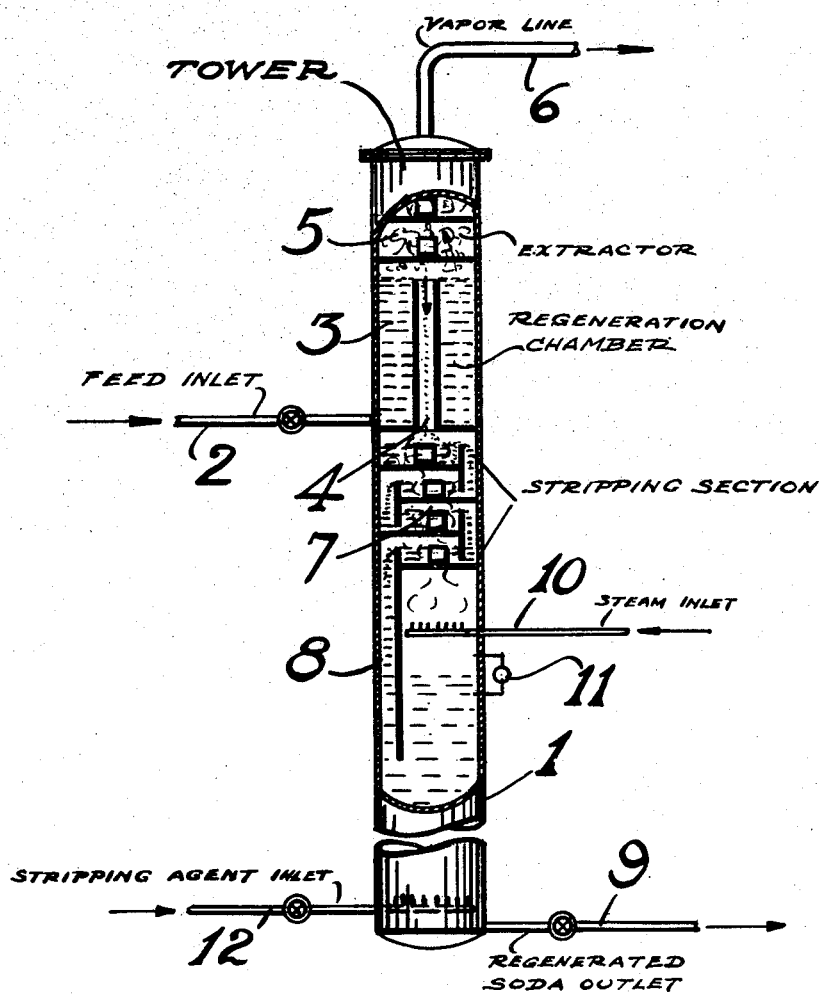

July 8, 1941. C. G. MORRISON ET AL 2,248,109
REGENERATION OF SULPHUR SOLVENTS
Filed Oct. 19, 1938 2 Sheets-Sheet 1

Walter H. Rupp
Carl G. Morrison Inventors
By P. H. Young Attorney

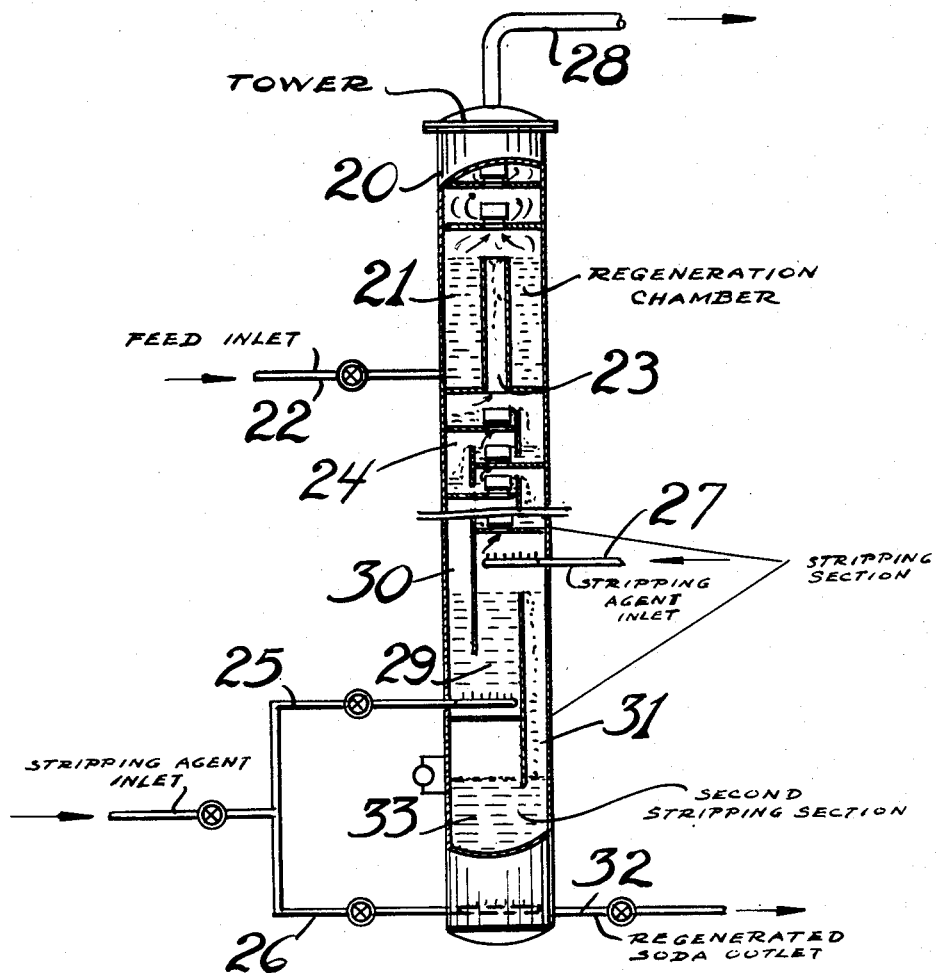

Patented July 8, 1941

2,248,109

UNITED STATES PATENT OFFICE 2,248,109

REGENERATION OF SULPHUR SOLVENTS

Carl G. Morrison and Walter H. Rupp, Elizabeth, N. J., assignors to Standard Oil Development Company, a corporation of Delaware Application October 19, 1938, Serial No. 235,812

3 Claims. (Cl. 23—283)

The present invention relates to the regeneration of solvents utilized in the removal of sulphur compounds from petroleum oils. The invention is particularly directed to an improved process and equipment for securing optimum regeneration of the spent solvent. In accordance with the present process the spent solvent, after removal from the treated petroleum oil, is heated to a regeneration temperature and introduced into a regeneration chamber in the upper part of a regeneration tower. The spent solvent flows upwardly through said regeneration chamber and is held in said chamber for a sufficient length of time to secure substantially complete regeneration of the spent solvent. The regenerated solvent then flows downwardly through said tower into a stripping section in which it contacts an upflowing stripping agent which removes entrained mercaptan compounds, and further improves the solvent.

It is well known in the art to utilize various solvents for the removal of sulphur compounds from petroleum oils and to regenerate the spent solvent by various processes. Solvents usually employed for the removal of mercaptan compounds from petroleum oils are various aqueous alkalies as for example aqueous sodium and potassium hydroxide. In these processes, the mercaptan containing oil is treated with sufficient quantity of alkali to convert the mercaptan compounds to the corresponding mercaptides. The quantity of aqueous alkali used depends upon the particular alkali being used as well as upon the type of petroleum oil being treated and the character of the sulphur compounds present. When employing caustic soda, it is the usual practice to employ aqueous solutions having a sodium hydroxide concentration of about 10 to 15%.

After contacting the oil, the spent alkali solution containing the sulphur compounds as mercaptides is regenerated by various processes. For example, the mercaptides may be oxidized by being treated with an oxygen-containing gas to form the di-sulphides. These compounds are then removed from the oil by a subsequent step, such as decantation. The mercaptides may also be hydrolized to form corresponding mercaptans which may be removed by volatilization. These processes, however, have not been entirely satisfactory due to the fact that the relatively higher molecular weight mercaptides are not readily oxidizable to di-sulphides. Furthermore, the relatively low molecular weight mercaptides are not readily hydrolizable to the corresponding mercaptans. In addition, the reactions cannot readily be combined in one operation commercially due to inherent difficulties attendant when reactions are combined.

We have, however, discovered a process, and apparatus for conducting the same, whereby substantially complete regeneration of spent alkali solvents can readily and commercially be attained in an economic manner. Our process may be readily understood by reference to the attached diagrammatic drawings disclosing one modification of the process and apparatus for conducting the same. Figure 1 is a diagrammatical sketch showing one modification of a suitable regeneration tower. Figure 2 illustrates a similar regeneration tower containing desirable modifications. Referring specifically to Figure 1, it may be seen that spent solvent, which for the purpose of the description is taken as sodium hydroxide, substantially saturated with sodium mercaptide, is introduced into regeneration chamber 3 in the upper section of tower 1 by means of spent soda feed line 2. The spent solvent prior to its introduction into regeneration chamber 3 is heated to an optimum regeneration temperature by suitable means as for example by heat exchanging equipment, steam coils, heating coils, and the like.

The spent solvent flows upwardly through chamber 3 and is maintained under optimum temperature and pressure conditions to secure substantially complete conversion of the mercaptides to the corresponding mercaptans. These latter compounds readily volatilize under the conditions maintained in the tower and are removed by means of vapor line 6. Before passing out through vapor line 6, the vapors pass through a mist extractor 5 which removes entrained liquids.

Regeneration chamber 3 is so designed with respect to operating conditions such as regeneration temperature, spent soda feed rate, and tower size, so that the spent soda will be maintained under ideal regeneration temperature conditions for an optimum period of time before being steam stripped.

After regeneration of the spent soda is secured, the soda overflows the inner wall of regeneration chamber 3 and flows downwardly through cylindrical area 4. After passing through 4, the regenerated soda is stripped in stripping section 7 by means of a stripping medium as for example steam introduced into tower 1 by means of line 10 or by means of line 12. For purposes of illustration, it is assumed the stripping agent employed is open steam. Stripping section 7 contains suitable means for steam stripping the down flowing soda as for example a number of bubble cap trays. In the stripping section, dissolved mercaptans are removed which flow upwardly through the tower and which are removed by means of line 6 along with the steam introduced for stripping purposes. The regenerated soda flows into the lower section of tower 1 by means of downflow 8 and is finally removed by means of regenerated soda line 9. A liquid level control 11 is adjusted to control the level of the regenerated soda in the bottom of tower 1. Tower 1 is of sufficient strength so that operating pressures up to 150 pounds per square inch may be employed.

Figure 2 illustrates a regeneration tower 20 of construction similar to tower 1 of Figure 1. Spent soda is introduced into regeneration chamber 21 in the upper section of regeneration tower 20 by means of feed line 22. The spent solvent prior to its introduction into chamber 21 is heated to a regeneration temperature by any suitable means not shown. The solvent flows upwardly through regeneration chamber 21 and when regenerated overflows the inner wall of chamber 21. Chamber 21 is so designed with respect to operating conditions, as for example regeneration temperature, solvent feed rate, and the like, so that the solvent will be subjected to temperature and time conditions adapted for maximum regeneration efficiency, prior to steam stripping the solvent. In regeneration chamber 21, the mercaptides are hydrolized to corresponding mercaptans. These mercaptans readily volatilize under the conditions maintained in tower 20 and are removed by means of vapor line 28.

After the solvent is regenerated, it overflows the inner wall of chamber 21 and flows downwardly through cylindrical section 23 in stripping section 24. In stripping section 24 entrained mercaptans are removed from the regenerated soda by means of a stripping agent, as for example open steam introduced by means of steam lines 25 and 26. The mercaptans stripped from the solvent in this section are removed from tower 20 by means of overhead vapor line 28 along with the stripping steam introduced by means of lines 25, 26, and 27. Steam stripping section 24 contains suitable stripping means as for example a number of bubble cap trays.

The steam stripped regenerated soda flows from stripping section 24 into the lower part of chamber 29 by means of downflow 30 where the soda may be further subjected to the temperature and pressure conditions of the tower subsequent to stripping. If this operation is desired, the stripping agent in introduced by means of line 27. The soda flows upwardly in chamber 29 and then flows downwardly into the tower bottom 33 by means of downflow 31. The regenerated soda is withdrawn from tower 20 by means of regenerated soda line 32.

The modification as illustrated in regeneration tower 20 may be particularly adapted to a regeneration process in which for example low pressure stripping steam is employed and it is desirable to pass the steam through the regenerated soda after the soda leaves the stripping section. By operating as described, it may be seen that when the regenerated soda is split into two equal volumes above the point of steam introduction 25 and 26, the liquid head to be overcome is approximately one half the liquid head if the regenerated soda were not split.

The process and the apparatus of the present invention may be widely varied. It may be adapted to regenerate any spent solvent although it is particularly adapted for the regeneration of spent caustic soda used in the removal of mercaptan compounds from petroleum oil. By spent solvent is meant solvent which is saturated with mercaptide compounds, or which contains sufficient quantities of these substances so that the solvent cannot be economically used for the removal of additional mercaptan compounds from oil.

Regenerated solvent includes all solvents which have had sufficient sulphur compounds removed therefrom so that the solvent can be economically reused for the removal of sulphur compounds from petroleum oils. If aqueous alkali solvents are regenerated, the regenerated solvent should have at least 50% of the sulphur compounds removed therefrom and preferably have at least 80% of the sulphur compounds removed therefrom.

The spent alkali must be introduced into a regeneration chamber in the upper section of a regeneration tower. The regeneration zone is so designed with respect to the feed rate, the tower size and regeneration temperature, to secure an optimum time for substantially complete regeneration before the soda overflows into the stripping section. In general, when regenerating caustic soda, the regeneration chamber should be so designed as to contain a unit volume of soda for about from 5 to 40 minutes, preferably 10 to 20 minutes. The overflow cylindrical section should be of sufficient volume so that uniform and even flow of both upflowing and downflowing phases is secured.

The temperature of regeneration likewise will depend upon the particular mercaptide present in the spent soda as well as the concentration of the same. In general, if atmospheric pressure is employed, the temperature should be above about 212° F. It is, however, preferred to use a pressure of at least 5 lbs. per square inch in which case the temperature should be above about 220° F. Particularly effective results are secured when the pressure employed is in the range of from 40 to 50 lbs. per square inch and the regeneration temperature is in the range of about 300–350° F. The temperature and pressure conditions are adjusted to secure substantially complete regeneration of the spent soda and so adjusted that all stripping steam introduced will be removed through the vapor line and no dehydration of the regenerated soda will occur. The quantity and temperature of steam introduced will be a function of feed rates, temperature, and pressure of regeneration, as well as other factors. In general, it is preferred to add as small a quantity of stripping steam as is necessary since additional steam merely overtaxes the capacity of the equipment.

In order to further illustrate the invention, the following data is presented giving operating conditions for the regeneration of a 12% sodium hydroxide solution used in the removal of sulphur compounds from petroleum oils.

|  | Operation I | Operation II |
| --- | --- | --- |
| Spent soda feed rate_____gal. per hour__ | 3,000 | 1,500 |
| Tower diameter_____feet__ | 4 | 3 |
| Capacity of regeneration chamber gallons__ | 750 | 200 |
| Time in regeneration chamber__minutes__ | 15 | 8 |
| Time in tower after leaving regeneration chamber_____do____ | ---------- | 18 |
| Pressure on tower_____pounds/sq. inch__ | 40 | 2 |
| Temperature in tower_____°F__ | 300 | 230 |

The foregoing disclosure and detailed description have been given for purposes of illustration only and should not be construed as limiting the invention since obvious modifications will occur to those skilled in the art.

We claim:

1. Tower for the regeneration of spent alkali metal hydroxide solutions containing mercaptides, said tower comprising a shell containing concentrically disposed, in about its upper third section, a flanged cylindrical element, the flange of which is transverse to the walls of the shell and attached to the shell at about a point intermediate the upper third and intermediate third sections of the shell, said shell containing in its intermediate section bubble cap plates extending transversely to the shell, means for maintaining a body of liquid in the lower section of said shell, comprising a conduit projecting therefrom and carrying a control valve, means for introducing steam into the lower section of said shell, means for introducing liquid above and substantially adjacent the flange of the cylindrical element into the area formed between said cylindrical element and the walls of the shell, and means for removing vapors overhead from said tower.

2. A treating tower, comprising an elongated substantially cylindrical vessel vertically disposed and having an upper regeneration section, an intermediate stripping section, and a lower stripping section, a flanged tubular member concentrically disposed in said regeneration section, the flanges of said tubular member being integral with the shell of said vessel, a plurality of bubble caps disposed in the said intermediate stripping section adapted to cause intimate contact between liquid flowing downwardly in said tower and gases flowing upwardly, conduit means projecting into the said regeneration section at a point just above the said flange, adapted to discharge liquid into the area between said tube and the walls of said vessel, and conduit means projecting into said lower stripping section, adapted to withdraw liquid therefrom, said conduit means carrying a valve adapted to control the flow of liquid from the tower and to maintain a body of liquid in said lower stripping section, and means for removing vapors overhead from said tower.

3. Tower as defined by claim 1, in which said means for maintaining a body of liquid in the lower section of said shell comprises two segregated sections, one disposed above the other, means for passing liquid from the top of the upper section into the lower section, means for introducing a stripping fluid into the bottom of the respective sections.

CARL G. MORRISON.
WALTER H. RUPP.